United States Patent
Miyamoto (10) Patent No.: US 7,882,916 B2
(45) Date of Patent: Feb. 8, 2011

(54) VEHICLE

(75) Inventor: Takehiro Miyamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/130,240

(22) Filed: May 30, 2008

(65) Prior Publication Data

US 2008/0296077 A1 Dec. 4, 2008

(30) Foreign Application Priority Data

May 30, 2007 (JP) ............................. 2007-143018
May 7, 2008 (JP) ............................. 2008-121042

(51) Int. Cl.
*B62D 61/02* (2006.01)
(52) U.S. Cl. ..................... 180/219; 280/276; 280/280
(58) Field of Classification Search ................ 180/219; 280/276, 280, 275
See application file for complete search history.

(56) References Cited

U.S. PATENT DOCUMENTS 6,783,158 B2 * 8/2004 Nakagawa et al. ........... 280/785
7,044,490 B2 * 5/2006 Ito et al. ...................... 280/276
7,258,356 B2 * 8/2007 Okazaki et al. ............. 280/272
2003/0127824 A1 * 7/2003 Hasegawa et al. ........... 280/272
2004/0140644 A1 * 7/2004 Kofuji et al. ................. 280/276
2005/0087969 A1 * 4/2005 Okazaki et al. ............. 280/771
2007/0164535 A1 * 7/2007 Nakamura ................... 280/276
2008/0100028 A1 * 5/2008 Mrdeza et al. ............... 280/280
2008/0203698 A1 * 8/2008 Suita .......................... 280/276

FOREIGN PATENT DOCUMENTS

JP        11-091671        4/1999

* cited by examiner

*Primary Examiner*—Joanne Silbermann
*Assistant Examiner*—Tashiana Adams
(74) *Attorney, Agent, or Firm*—Keating & Bennett, LLP (57) ABSTRACT

A motorcycle in which a central axis of a shaft and a central axis of front forks are not parallel to each other, and assembly work of the shaft, front forks and an upper bracket is not complicated. A steering shaft is rotatably supported by a head pipe. An upper bracket supports the steering shaft and front forks. The steering shaft includes upper and lower steering shafts. The upper steering shaft is inserted in the upper bracket and then fixed to the lower steering shaft.

11 Claims, 10 Drawing Sheets

VEHICLE

RELATED APPLICATIONS

This application claims the benefit of priority under 35 USC 119 of Japanese patent application no. 2007-143018, filed on May 30, 2007, and Japanese patent application no. 2008-121042, filed on May 7, 2008, which applications are hereby incorporated by reference in their entireties.

BACKGROUND OF THE INVENTION

1. Field of the Invention

The present invention relates to a vehicle, and more particularly to a vehicle having a shaft and a bracket for supporting the shaft.

2. Description of Related Art

Conventionally, a vehicle having a bracket for supporting a shaft such as a steering shaft has been known (for example, see JP-B-3778536). JP-B-3778536 discloses a motorcycle including a steering shaft, a front fork and a topside bracket for fixing the steering shaft and the front fork. A central axis of the steering shaft and a central axis of the front fork are not parallel to and intersect with each other. The topside bracket is configured such that a front fork inserting hole having an inner diameter substantially equal to an outer diameter of the front fork is provided, and a steering shaft inserting hole having an inner diameter larger than an outer diameter of the steering shaft is provided. Accordingly, the topside bracket can be fitted to a steering shaft and a front fork that are not parallel to each other at a time of assembly. In addition, the motorcycle of JP-B-3778536 is configured to eliminate rattle of the steering shaft by inserting a collar having an inner diameter equal to the outer diameter of the steering shaft in the steering shaft inserting hole after the topside bracket is fitted to the steering shaft and the front fork, and further by tightening a cap nut onto the steering shaft.

In order to eliminate the rattle of the steering shaft in the motorcycle of JP-B-3778536, the collar must be inserted in and on both the steering shaft inserting hole and the steering shaft without any play after inserting the steering shaft in the steering shaft inserting hole, and the cap nut must be tightened onto the steering shaft. Therefore, the assembly work of the steering shaft and front forks is complicated by the topside bracket.

SUMMARY OF THE INVENTION

The present invention addresses this problem and provides a vehicle in which assembly work of the shaft, front forks and topside bracket is not complicated, even when the central axis of the shaft and the central axis of the front forks are not parallel to each other.

A vehicle according to one aspect of the present invention includes: a head pipe; a shaft rotatably supported by the head pipe; a front fork; and a topside bracket by which the shaft and the front fork are supported. The shaft includes a topside shaft and a downside shaft, and the topside shaft is fixed to the downside shaft by being inserted in the topside bracket.

In the present invention, as described above, the topside shaft is fixed to the downside shaft while being inserted in the topside bracket. Thereby, even when a central axis of the shaft and that of the front fork are not parallel to each other, the front fork and the shaft can be attached to the topside bracket only by inserting the topside shaft in the topside bracket and fixing the topside shaft to the downside shaft in a state where the front fork and the downside shaft are inserted in the topside bracket. Accordingly, assembly work of the shaft, front forks and topside bracket does not become complicated.

In one embodiment, the topside bracket includes a front fork inserting hole in which the front fork is inserted; a topside shaft inserting hole in which the topside shaft of the shaft is inserted; and a downside shaft accommodating hole, which is in communication with the topside shaft inserting hole, for accommodating the downside shaft. A predetermined clearance is formed between the downside shaft and the downside shaft accommodating hole. With this configuration, the topside bracket is easily fit on the front fork and the downside shaft, both of which are not parallel to each other, and the topside shaft is easily fixed to the downside shaft by inserting the topside shaft in the topside bracket. Therefore, the assembly work of the shaft, front fork and topside bracket is easily prevented from becoming complicated.

In one embodiment, the front fork inserting hole has an inner diameter equal to an outer diameter of a portion of the front fork inserted in the front fork inserting hole, and the topside shaft inserting hole has an inner diameter equal to an outer diameter of a portion of the topside shaft inserted in the topside shaft inserting hole. By this configuration, the rattle produced between the front fork and the topside bracket or between the topside shaft and the topside bracket is eliminated when the front fork and topside shaft are attached to the topside bracket.

In one embodiment, a portion of the topside shaft inserted in the topside shaft inserting hole of the topside bracket has a taper-shaped section narrowing toward the downside shaft. The topside shaft is thereby easily inserted in the topside shaft inserting hole of the topside bracket, which has an inner diameter equal to the outer diameter of the topside shaft, due to the taper-shaped section of the topside shaft. It is also easy to coaxially adjust the central axis of the topside shaft with that of the topside shaft inserting hole. Thereby, the assembly work of the shaft and topside bracket does not become complicated.

In one embodiment, the topside shaft includes a first screw section formed at a tip on the downside shaft side, and a second screw section screwed to the first screw section is formed at a tip of the downside shaft on the topside shaft side. Because the topside shaft can be fixed to the downside shaft by inserting the topside shaft in the topside bracket and then screwing the first screw section of the topside shaft to the second screw section of the downside shaft at the time of assembly, the assembly work of the shaft and the topside bracket is further prevented from becoming complicated.

In one embodiment, the shaft and the front fork are disposed not to be parallel to each other so that a shared central axis of the topside shaft and the downside shaft intersects with the central axis of the front fork. Even in such a case that the central axes of the shafts are not disposed in parallel with each other, the assembly work of the shaft, the front fork and the topside bracket does not become complicated.

In one embodiment, the downside bracket is disposed below the head pipe and supports the shaft and the front fork. By this configuration, because the downside bracket suppresses downward movement of the shaft and movement of the front fork in a vehicle width direction, the shaft and front forks are stably supported.

In one embodiment, the downside shaft is rotatably supported by a first bearing member disposed at the top end of the head pipe, and by a second bearing member disposed at the bottom end of the head pipe and supported upward by a support section of the downside bracket. By this configuration, because turning of the downside shaft is made smooth by the first and second bearing members, and because the downside shaft is supported at two separated points, which are the top and bottom ends of the downside shaft, the downside shaft is supported stably when turning.

In one embodiment, a third screw section is provided on a periphery of the downside shaft and a nut is screwed to the third screw section of the downside shaft and fixes the first bearing member. The position of the first bearing member relative to the downside shaft is thereby retained by the nut.

In one embodiment, the topside bracket includes a downside shaft accommodating hole for accommodating the downside shaft and a collar disposed between the top surface of the nut and the top surface of the downside shaft inserting hole of the topside bracket. The height position of the topside bracket is thereby easily adjusted.

In one embodiment, a pair of front forks is provided, and top ends of the front forks are fixed by being inserted in the front fork inserting holes of the topside bracket near both ends of the topside bracket in a vehicle width direction. This configuration further stabilizes the vehicle compared to a case where a single front fork is provided. In addition, the front forks are fixed to both ends relative to a rotational axis of the topside bracket. Therefore, when the topside bracket turns, the front forks can turn effectively.

Other features and advantages of the invention will be apparent from the following detailed description, taken in conjunction with the accompanying drawings that illustrate, by way of example, various features of embodiments of the invention.

DETAILED DESCRIPTION OF THE INVENTION

An embodiment of the present invention is now described with reference to the drawings.

Figure 1:
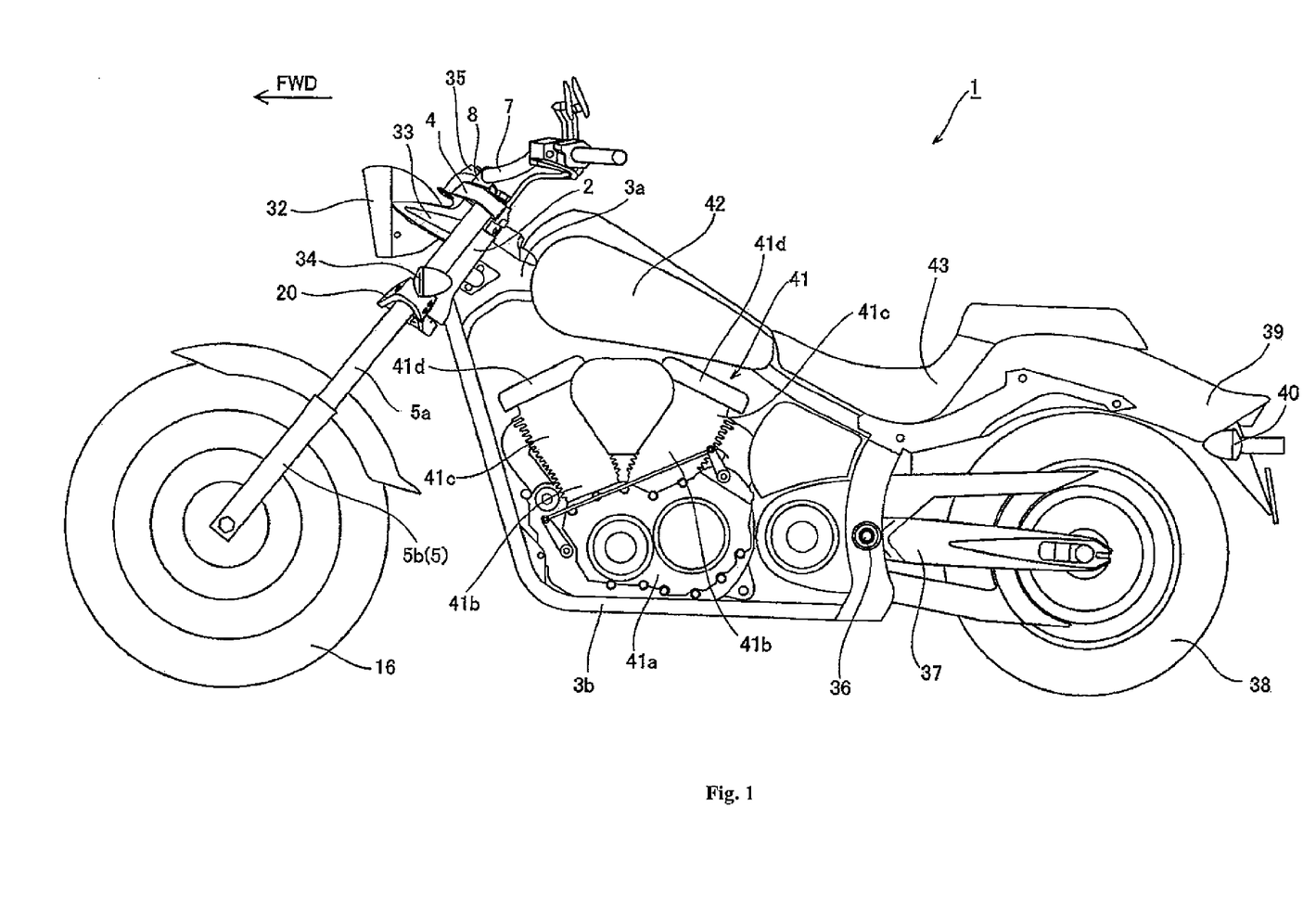
FIG. 1 is a side view of a motorcycle according to an embodiment of the present invention.
Figure 2:
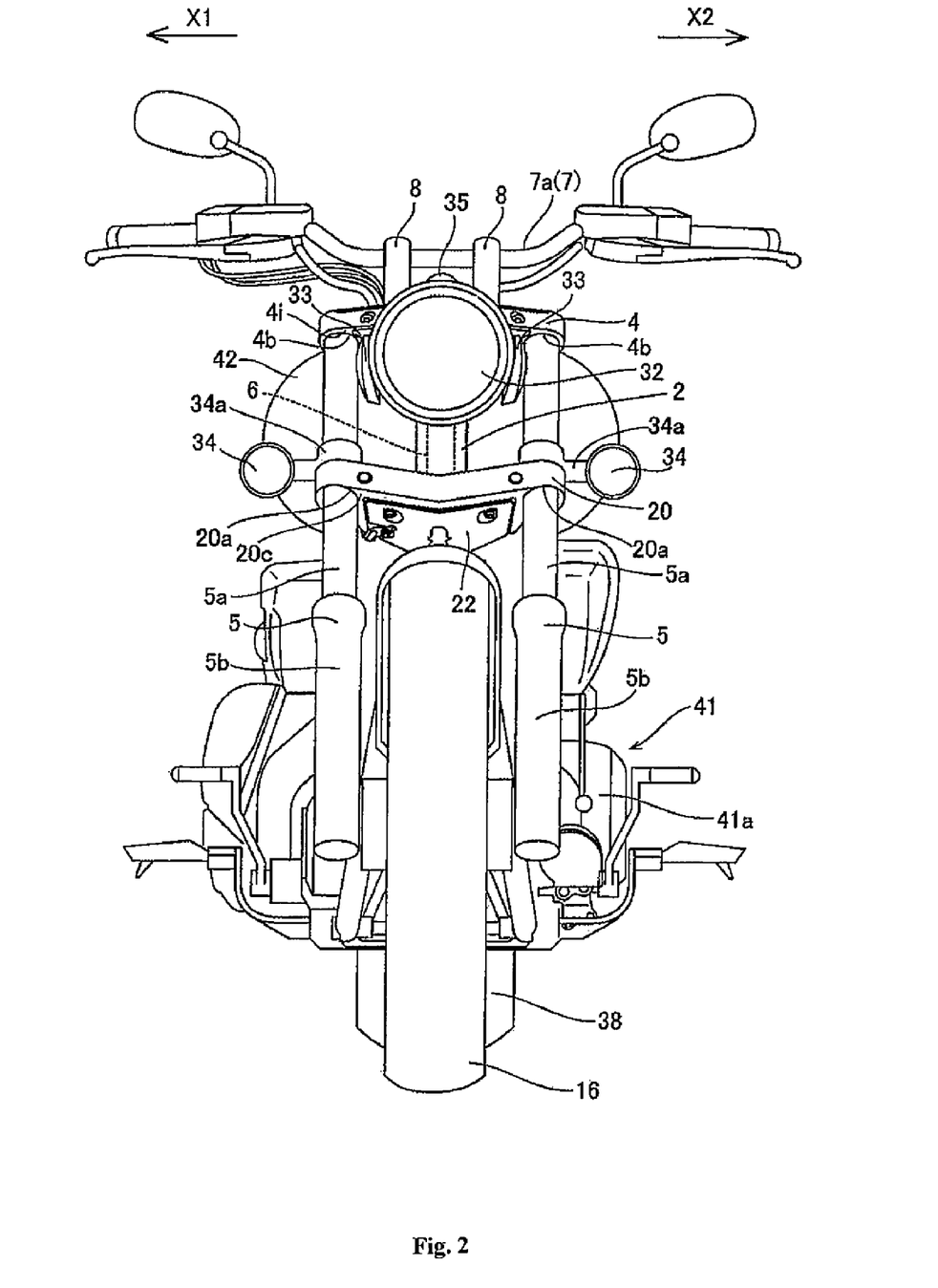
FIG. 2 is a front view of the motorcycle of FIG. 1.

FIG. 1 is a side view of a motorcycle 1 according to an embodiment of the present invention. FIG. 2 is a front view of motorcycle 1. FIGS. 3-9 describe the construction of motorcycle 1. Motorcycle 1 is an example of a vehicle of the present invention. The direction indicated by arrow FWD in the drawings is a forward traveling direction of motorcycle 1.

Referring to FIG. 1, motorcycle 1 has a main frame 3a connected to the rear. of a head pipe 2. A down tube 3b extends downward and rearward from a lower part of head pipe 2. Head pipe 2, main frame 3a and down tube 3b constitute a body frame.

Figure 5:
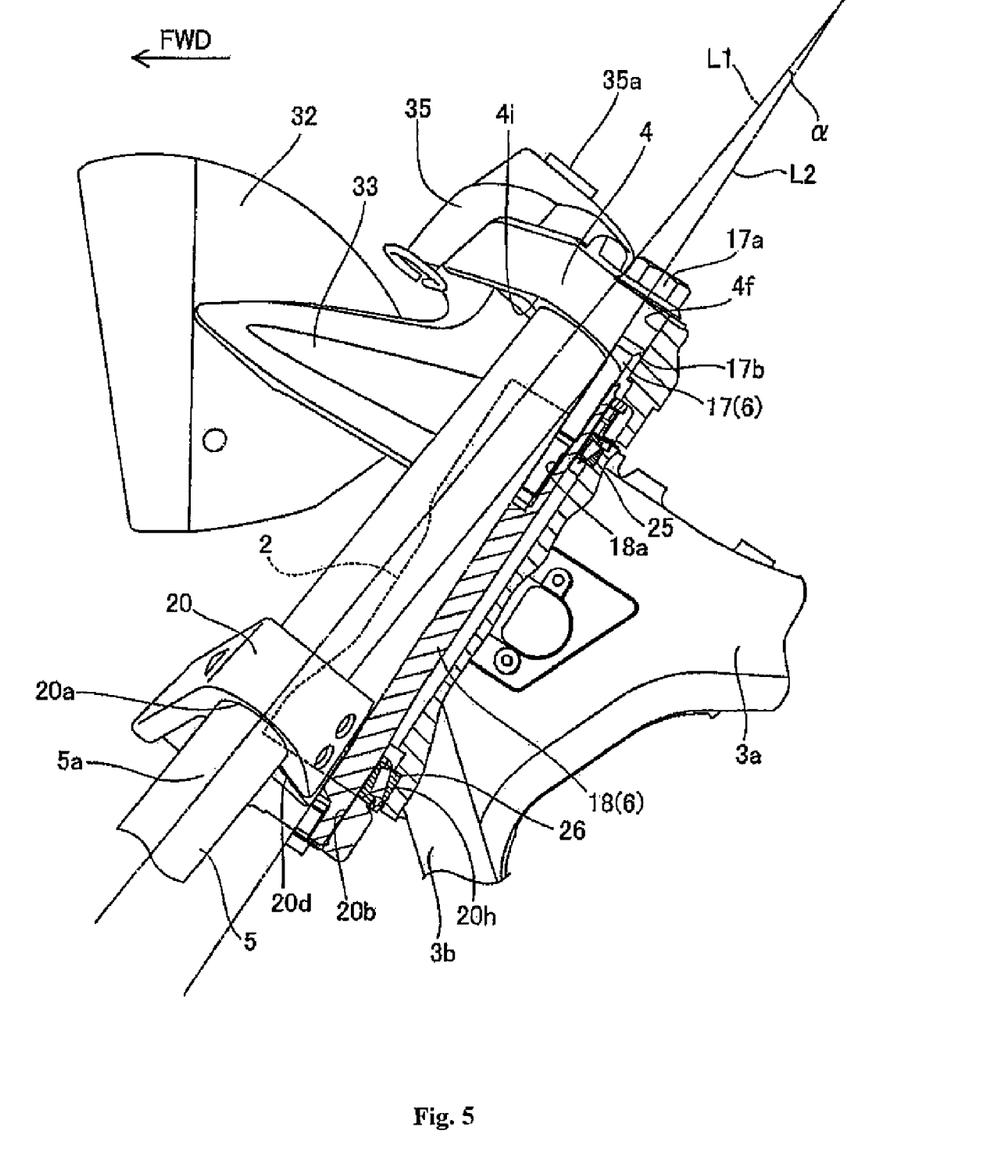
FIG. 5 is a partial sectional view showing a front fork and a steering shaft of the motorcycle of FIG. 1.

As shown in FIGS. 1, 2 and 5, an upper bracket 4 that is rotatable with respect to head pipe 2 is disposed above head pipe 2. As shown in FIG. 2, a pair of front forks 5, a steering shaft 6 and a pair of handlebar stays 8 for attaching handlebars 7 are fixed to upper bracket 4. Upper bracket 4 is an example of a "topside bracket" of the present invention, and steering shaft 6 is an example of a "shaft" of the present invention.

Figure 3:
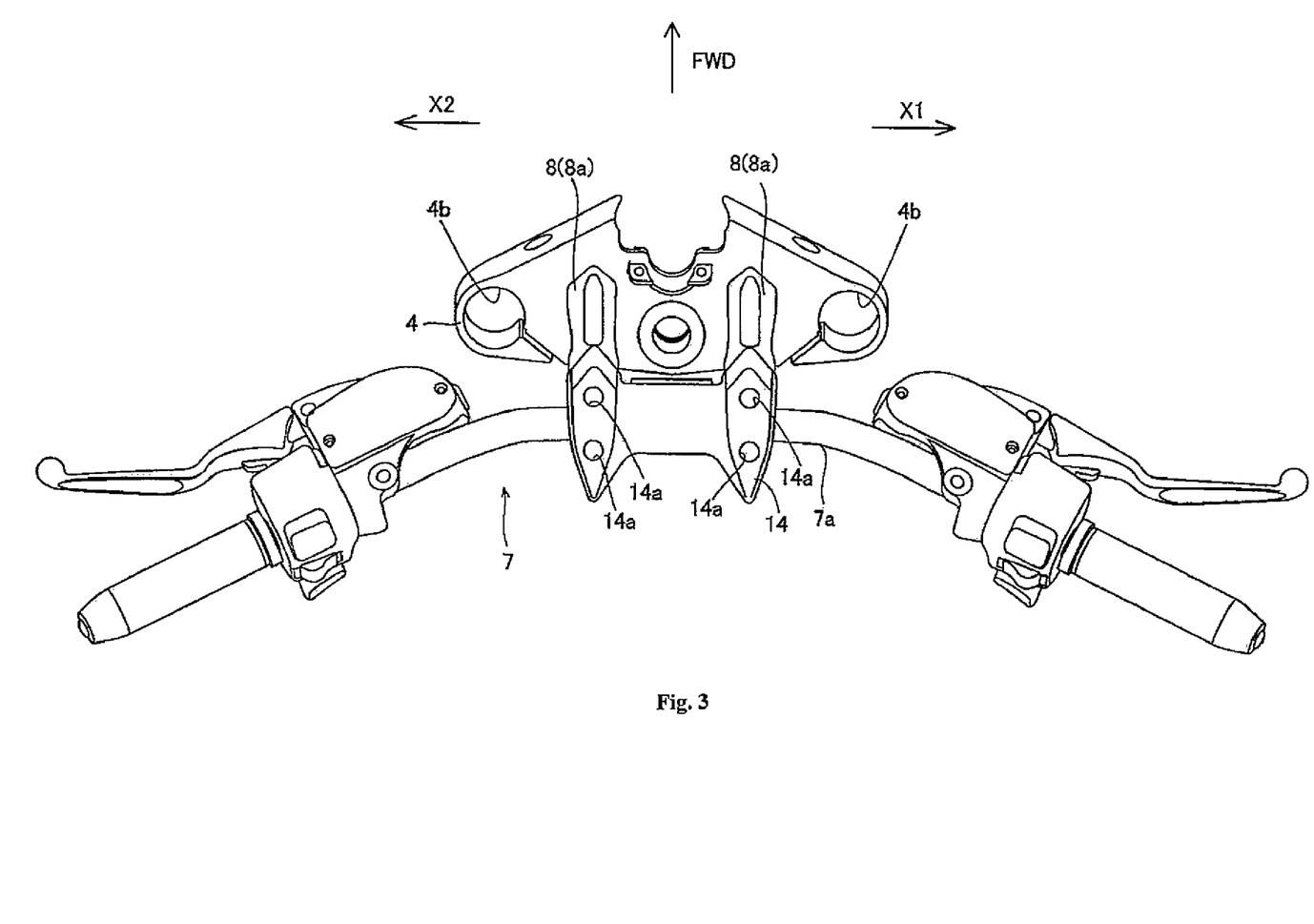
FIG. 3 is a top plan view of a structure surrounding handlebars of the motorcycle of FIG. 1.
Figure 4:
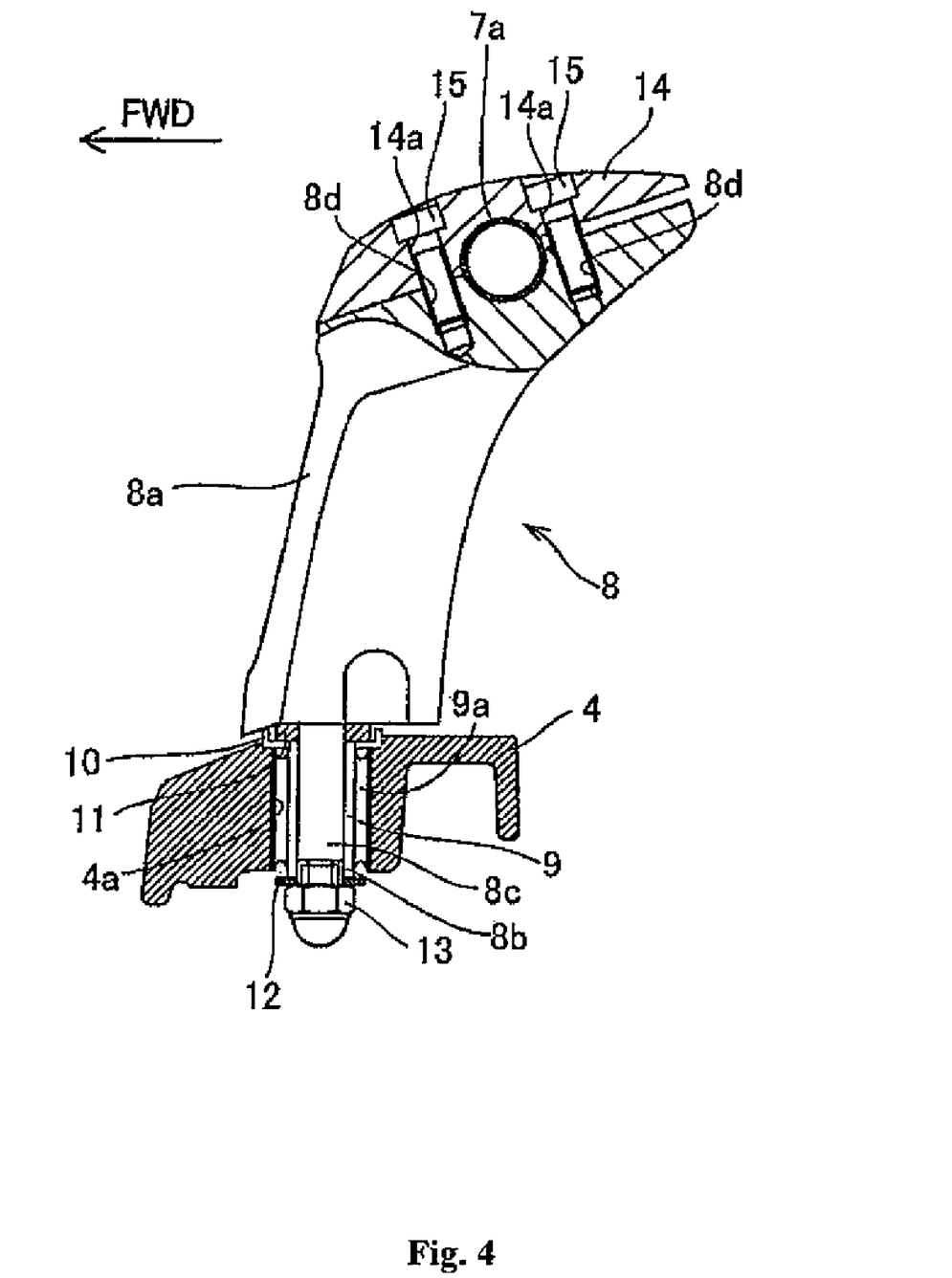
FIG. 4 is a partial sectional view taken through the structure surrounding the handlebars of the motorcycle of FIG. 1.
Figure 8:
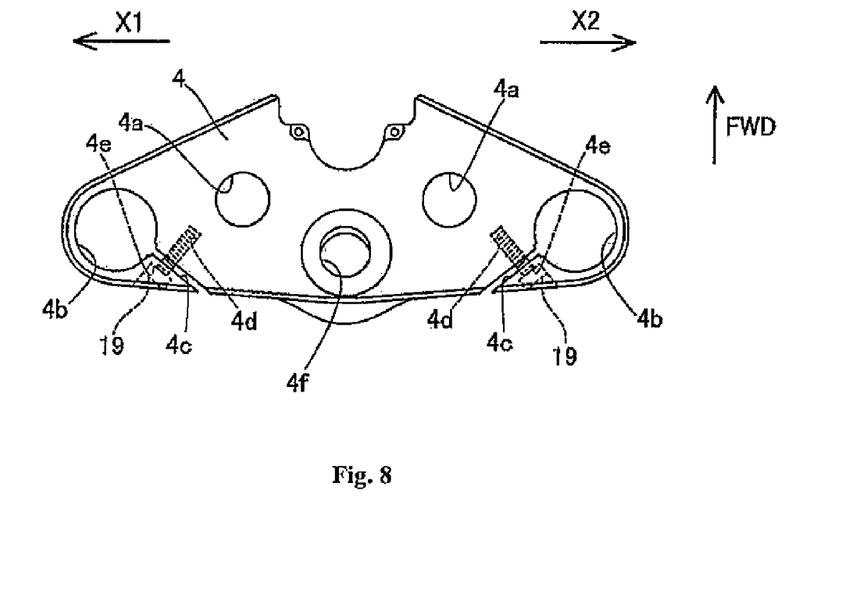
FIG. 8 is a top plan view of an upper bracket of the motorcycle of FIG. 1.

Also, as shown in FIGS. 3 and 4, handlebar stays 8 are attached to a top surface of upper bracket 4 to project upward. More specifically, as shown in FIG. 4, each handlebar stay 8 has a main body Sa and a support shaft 8c under main body 8a. A screw section 8b is provided at a lower end of support shaft 8c. As shown in FIGS. 4 and 8, a pair of handlebar stay mounting holes 4a passes through upper bracket 4 from the top and bottom surfaces thereof. A bush 9 with an outer peripheral surface made of a shock absorber 9a is fitted to an inner peripheral surface of each handlebar stay mounting hole 4a. A damper 10 and a washer 11 that can depress microvibration occurring while traveling are disposed on top of each bush 9. Each washer 11 supports the bottom surface of main body 8a of each handlebar stay 8. A nut 13 is attached to screw section 8b via a washer 12.

As shown in FIG. 3, a stay cover 14 is fixed to the top of main body 8a of each handlebar stay 8 to hold a handlebar pipe 7a extending in a vehicle width direction (direction of arrows X1 and X2) between main bodies 8a of handlebar stays 8. More specifically, four screw inserting holes 14a are formed in an upper part of stay cover 14, and handlebar stays 8 are each formed with two screw holes 8d, as shown in FIG. 4. Stay cover 14 is attached to handlebar stays 8 by screwing screw members 15 into screw holes 8d in a state that screw members 15 are inserted in screw inserting holes 14a. Accordingly, upper bracket 4 can be turned via handlebar stays 8 when handlebar pipe 7a is turned.

As shown in FIGS. 2 and 3, front fork inserting holes 4b are formed near both ends of upper bracket 4 in the vehicle width direction (the arrow X1 and X2 directions). Front fork inserting hole 4b is an example of a "front fork inserting hole" of the present invention. Front forks 5 are inserted in front fork inserting holes 4b and then fixed to upper bracket 4 near the top end. Each front fork 5 includes an inner tube 5a at a topside thereof (on the handlebar 7 side), and an outer tube 5b at a downside thereof (on a side of a front wheel 16) that is slidable on a periphery of inner tube 5a. Inner tube 5a has an outer diameter that is equal to an inner diameter of front fork inserting hole 4b. Front wheel 16 is rotatably attached to the lower parts of outer tubes 5b.

Figure 6:
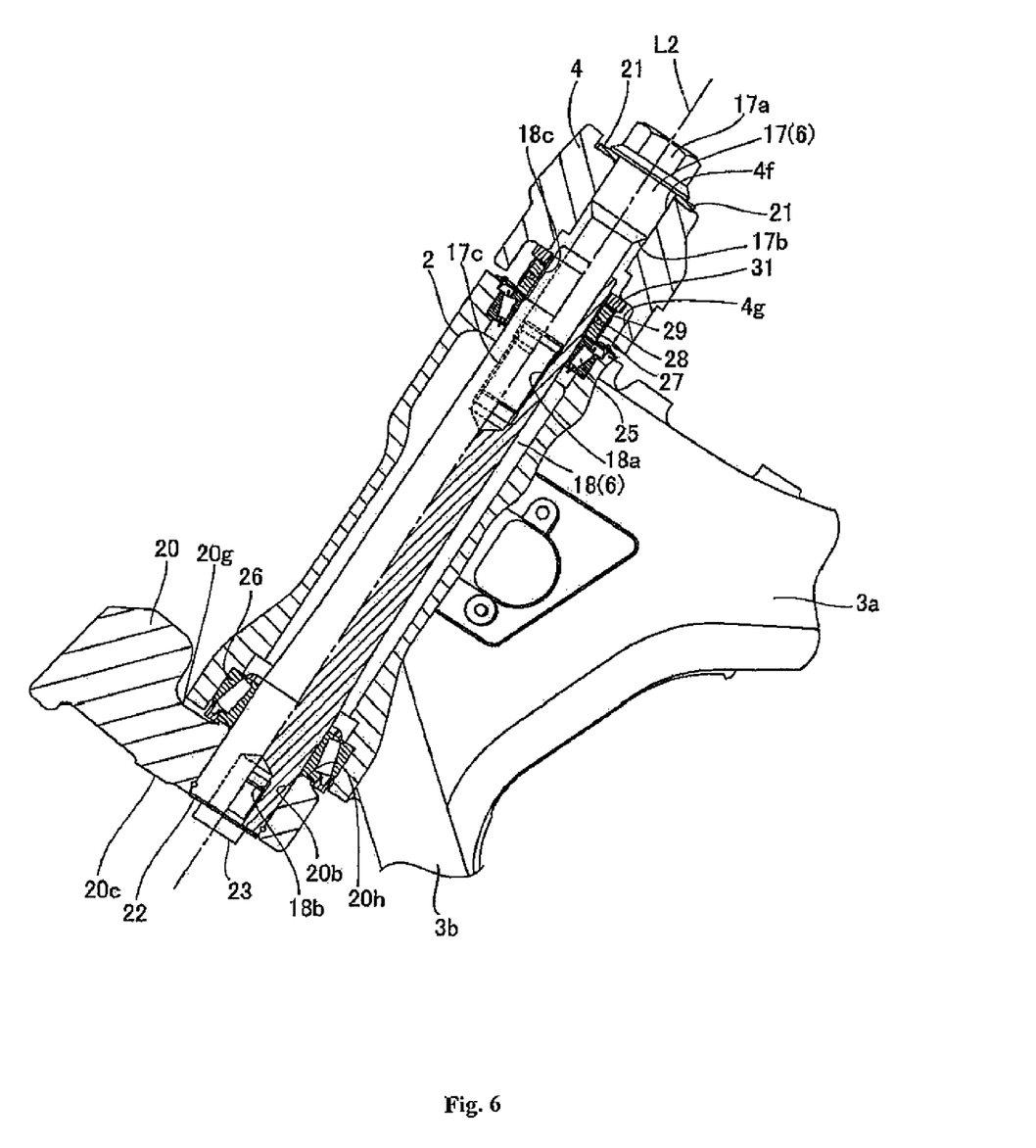
FIG. 6 is a partial sectional view showing a structure of the steering shaft of the motorcycle of FIG. 1.
Figure 7:
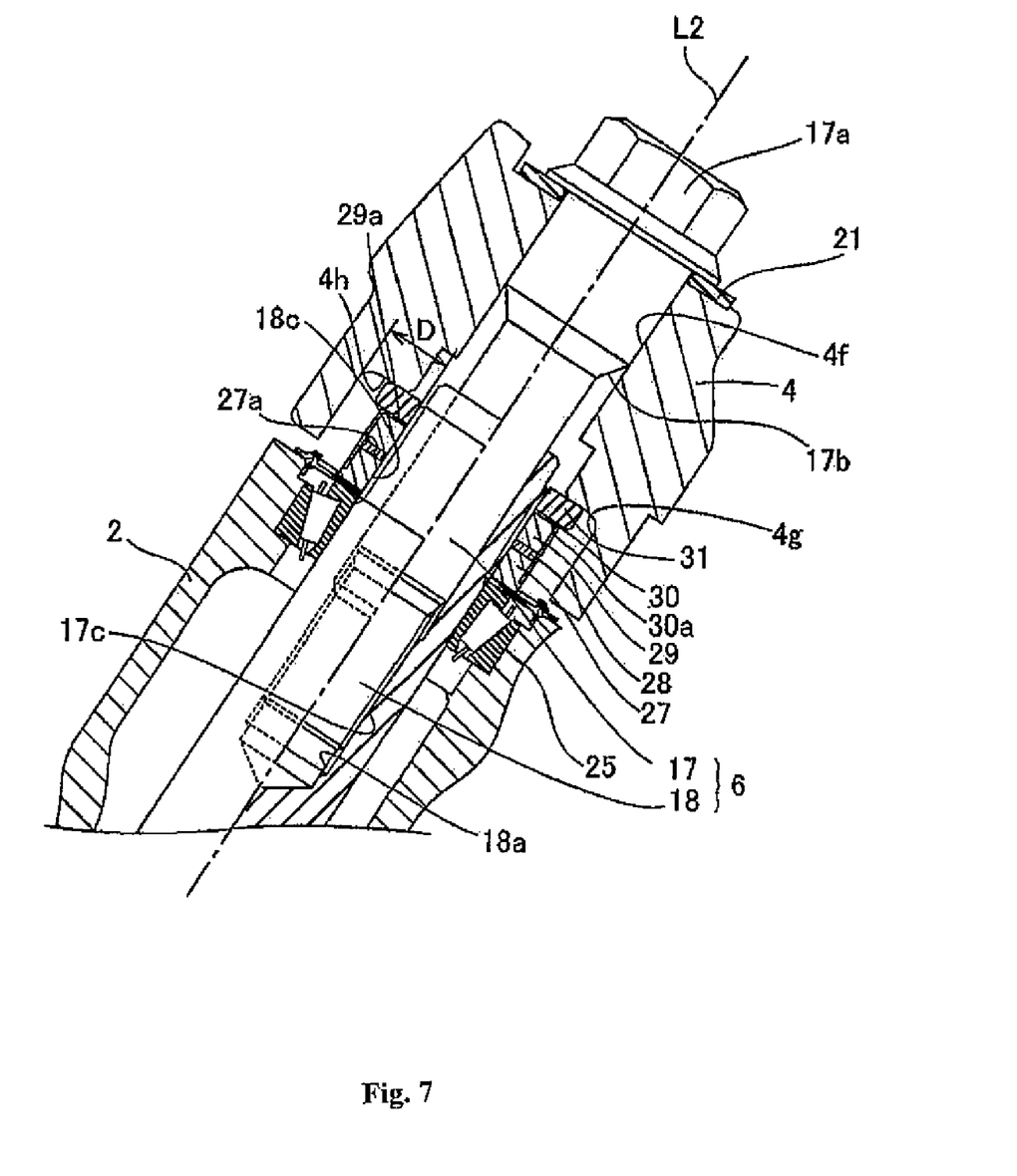
FIG. 7 is an enlarged partial sectional view showing a structure of the upper part of the steering shaft of FIG. 6.

As shown in FIGS. 6 and 7, a steering shaft 6 is configured such that an upper steering shaft 17 and a lower steering shaft 18 are separable from each other. More specifically, upper steering shaft 17 includes a head section 17a of a hexagonal shape to be easily attached with a tool such as a screw wrench, a taper-shaped section 17b having a tapering-down shape, and a screw section 17c. Lower steering shaft 18 includes a screw hole 18a to which screw section 17c of upper steering shaft 17 is screwed, and a screw hole 18b for fixing lower steering shaft 18 to an under bracket 20. Upper steering shaft 17 is an example of a "topside shaft" of the present invention. Screw section 17c is an example of a "first screw section" of the present invention. Lower steering shaft 18 is an example of a "downside shaft" of the present invention. Screw section 18a is an example of a "second screw section" of the present invention.

As shown in FIG. 5, a central axis L1 of front forks 5 and a central axis L2 of steering shaft 6 are not parallel to each other and intersect with each other at an angle α (α=approximately 6 degree).

As shown in FIG. 8, a slit 4c is formed between the inner peripheral surface of each front fork inserting hole 4b and a rear side surface of upper bracket 4 (a surface in a direction opposite from the arrow FWD direction). A screw hole 4d is formed in one surface of slit 4c and a screw inserting hole 4e is formed in the other surface of slit 4c. Screw members 19 inserted through screw inserting holes 4e are screwed to screw holes 4d with the top ends of inner tubes 5a of front forks 5 (FIG. 2) being inserted in front fork inserting holes 4b. In other words, the inner diameters of front fork inserting holes 4b can be decreased by reducing the spacing of slits 4c. Thereby, front forks 5 can be tightly fixed to upper bracket 4.

As shown in FIG. 8, an upper steering shaft inserting hole 4f in which upper steering shaft 17 is inserted is formed on the top surface side of upper bracket 4 at the substantial center in the vehicle width direction (the arrows X1 and X2 directions). As shown in FIGS. 6 and 7, a lower steering shaft accommodating hole 4g in which lower steering shaft 18 is accommodated without a direct contact therewith is formed on the bottom surface side of upper bracket 4 at the substantial center in the vehicle width direction (the arrows X1 and X2 directions). More specifically, an inner diameter of upper steering shaft inserting hole 4f is equal to the outer diameter of a portion of upper steering shaft 17 abutting against upper steering shaft inserting hole 4f. Upper steering shaft inserting hole 4f is in communication with lower steering shaft accommodating hole 4g. In addition, an inner diameter of lower steering shaft accommodating hole 4g is larger than the outer diameter of a portion of lower steering shaft 18 accommodated in lower steering shaft inserting hole 4g. That is, as shown in FIG. 7, a predetermined clearance D is formed between the outer peripheral surface of lower steering shaft 18 and an inner peripheral surface of lower steering shaft accommodating hole 4g. Upper steering shaft inserting hole 4f is an example of a "topside shaft inserting hole" of the present invention, and lower steering shaft accommodating hole 4g is an example of a "downside shaft accommodating hole" of the present invention.

As shown in FIGS. 6 and 7, a washer 21 is disposed between the bottom surface of head section 17a of upper steering shaft 17 and the top surface of upper bracket 4. Upper steering shaft 17 is configured to be fixed to lower steering shaft 18 in a state where upper steering shaft 17 is inserted in upper bracket 4.

As shown in FIGS. 2 and 6, under bracket 20 is disposed below head pipe 2 for turning relative to head pipe 2. Under bracket 20 is an example of a "downside bracket" of the present invention and supports head pipe 2 upward at a substantial center of under bracket 20 in the vehicle width direction (the arrow X1 and X2 directions of FIG. 2).

Figure 9:
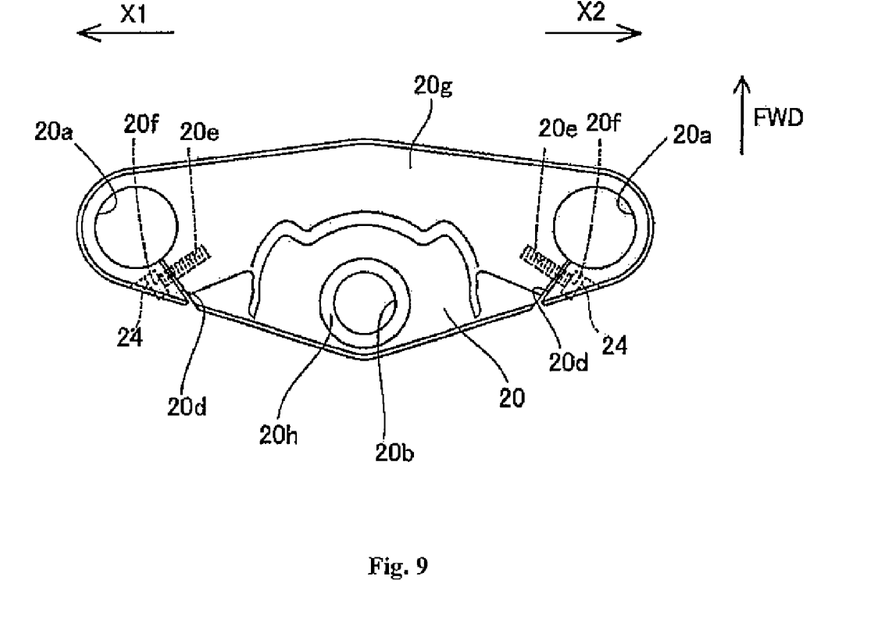
FIG. 9 is a top plan view of an under bracket of the motorcycle of FIG. 1.

As shown in FIGS. 2 and 9, a pair of front fork inserting holes 20a is formed near both ends of under bracket 20 in the vehicle width direction (the arrow X1 and X2 directions). Inner tubes 5a of front forks 5 are fixed by front fork inserting holes 20a. Thereby, midsections of front forks 5 are supported by under bracket 20 while the top ends of front forks 5 are supported by upper bracket 4. As a result, because front forks 5 are supported at two points, front forks 5 are stably supported. In addition, as shown in FIGS. 6 and 9, a lower steering shaft inserting hole 20b is provided at the substantial center of under bracket 20 in the vehicle width direction (the directions of arrows X1 and X2 in FIG. 9). Lower steering shaft 18 is fixed to under bracket 20 by screwing a screw member 23 to screw hole 18b of lower steering shaft 18 via a guide plate 22 attached to a bottom surface 20c of under bracket 20.

As shown in FIG. 9, a slit 20d is formed between an inner peripheral surface of each front fork inserting hole 20a and the rear surface of under bracket 20 (a surface in the direction opposite from the arrow FWD direction). A screw hole 20e is formed in one surface of slit 20d and a screw inserting hole 20f is formed in the other surface of slit 20d. Screw members 24 inserted through screw inserting holes 20f are screwed to screw holes 20e with front forks 5 being inserted in front fork inserting holes 20a. In other words, the inner diameters of front fork inserting holes 20a can be decreased by screwing screw members 24 and thus reducing the respective spacing of slits 20d. Thereby, front forks 5 can be tightly fixed to under bracket 20. Moreover, as shown in FIG. 2, inner tubes 5a of front forks 5 are inserted in front fork inserting holes 20a. Inner tubes 5a are each fixed in a predetermined position such that the highest point that outer tube 5b can reach when moving upward does not contact bottom surface 20c of under bracket 20.

As shown in FIGS. 5 and 6, a taper-rolling bearing 25 is fitted in the top end of head pipe 2, and a taper-rolling bearing 26 is fitted in the bottom end of head pipe 2. Taper-rolling bearing 25 is an example of a "first bearing member" of the present invention, and taper-rolling bearing 26 is an example of a "second bearing member" of the present invention. As shown in FIG. 9, a substantially flat support section 20h is provided on a top surface 20g of under bracket 20, and as shown in FIG. 6, taper-rolling bearing 26 is supported by support section 20h in an upward direction. Because the outer peripheral surface of lower steering shaft 18 contacts inner peripheral surfaces of taper-rolling bearing 25 and taper rolling bearing 26, lower steering shaft 18 is turnable by taper-rolling bearing 25 and taper-rolling bearing 26.

As shown in FIGS. 6 and 7, a screw section 18c is formed on the topside external surface of lower steering shaft 18. A nut 27 is screwed on screw section 18c and is disposed on a top surface of taper-rolling bearing 25. A washer 28 is disposed on a top surface 27a of nut 27. A nut 29 is disposed on a top surface of washer 28 and is screwed on screw section 18c of lower steering shaft 18. A spacer 30 with a plurality of legs 30a is disposed on a top surface 29a of nut 29. Legs 30a are formed to contact side surfaces of nut 27, washer 28 and nut 29. The position of taper-rolling bearing 25 relative to lower steering shaft 18 can be retained by nut 27, washer 28, nut 29 and spacer 30. Screw section 18c is an example of a "third screw section" of the present invention. Nut 29 is an example of a "nut" of the present invention, and top surface 29a is an example of a "top surface of a nut" of the present invention.

As shown in FIG. 6, lower steering shaft 18 is supported at two separate points at the top and bottom ends thereof by taper-rolling bearing 25, which is fixed by nut 27 and is supported downward, and taper-rolling bearing 26 supported upward by support section 20h of under bracket 20. As shown in FIG. 7, a collar 31 is disposed between a top surface of spacer 30 and a top surface 4h of lower steering shaft accommodating hole 4g of upper bracket 4. Collar 31 is an example of a "collar" of the present invention, and top surface 4h is an example of a "top surface of a downside steering shaft accommodating hole" of the present invention.

As shown in FIG. 2, a pair of headlight stays 33 for holding a headlight 32 is provided on upper bracket 4. Headlight stays 33 are, as shown in FIG. 5, fixed to a bottom surface 4i of upper bracket 4 and are configured to turn in the same direction in which upper bracket 4 is turned.

As shown in FIG. 2, flickers 34 are disposed above front fork inserting holes 20a of under bracket 20. Each flicker 34 is attached to inner tube 5a of each front fork 5 via a bracket 34a.

As shown in FIG. 1, a main power supply section 35 of motorcycle 1 is provided in front (the arrow FWD direction side) of upper bracket 4. Main power supply section 35 projects forward (in the arrow FWD direction). A key entry 35a (see FIG. 5) for a key is provided on top of main power supply section 35.

A pivot shaft 36 is provided in the lower part of main frame 3a. A front end of a rear arm 37 is pivotally supported to be swingable in the vertical direction by pivot shaft 36. A rear wheel 38 is rotatably mounted on a rear end of rear arm 37. A rear fender 39 is disposed above rear wheel 38. A pair of flickers 40 is attached to rear parts of rear fender 39.

An engine 41 is disposed in main frame 3a. Engine 41 is an air-cooled engine and is composed of a crankcase 41a, a cylinder block 41b, a cylinder head 41c and a cylinder head cover 41d. A fuel tank 42 is disposed above engine 41. A seat 43 is disposed behind fuel tank 42.

Figure 10:
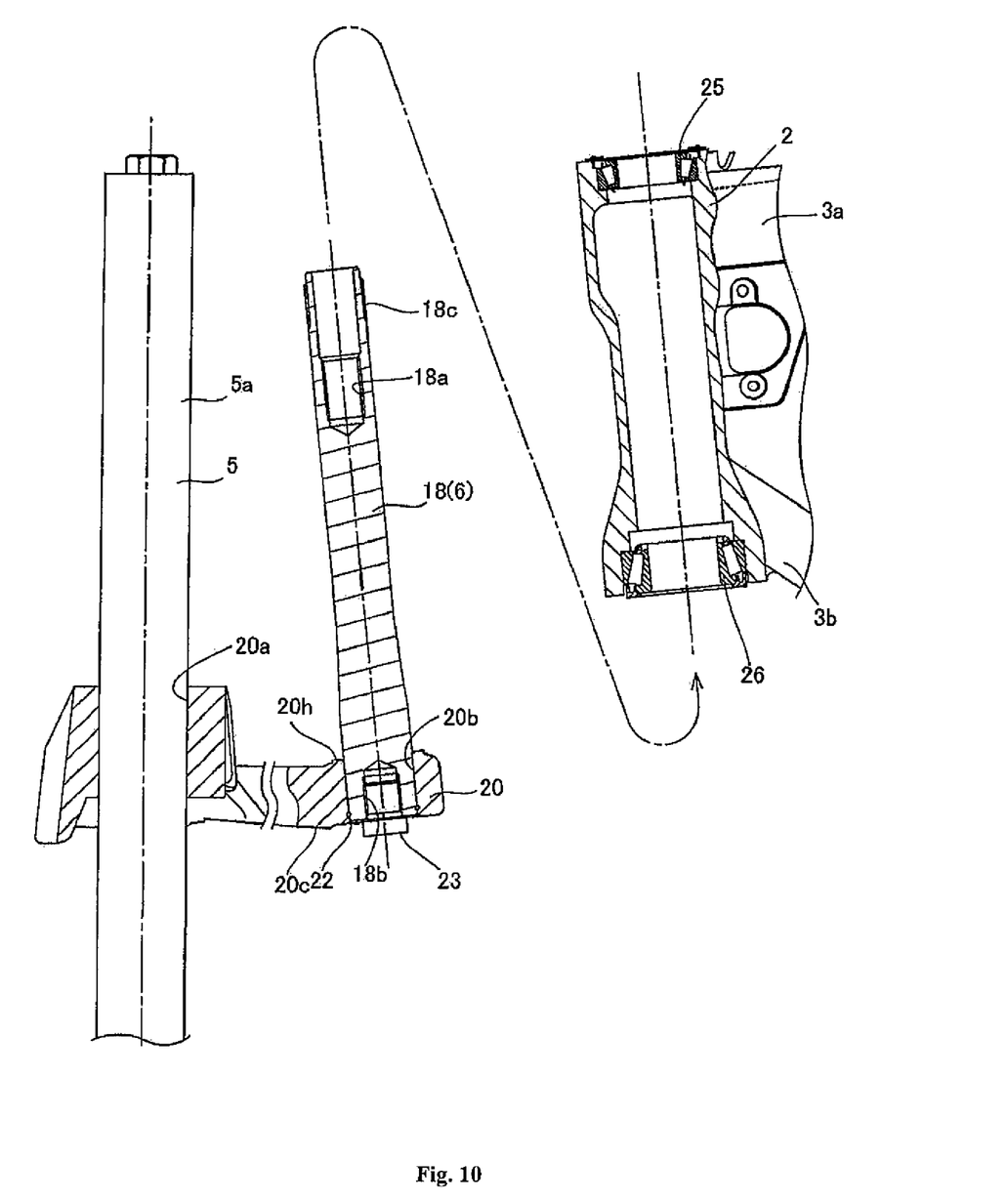
FIG. 10 illustrates an assembling sequence of the front fork, the steering shaft and a head pipe of the motorcycle of FIG. 1.
Figure 11:
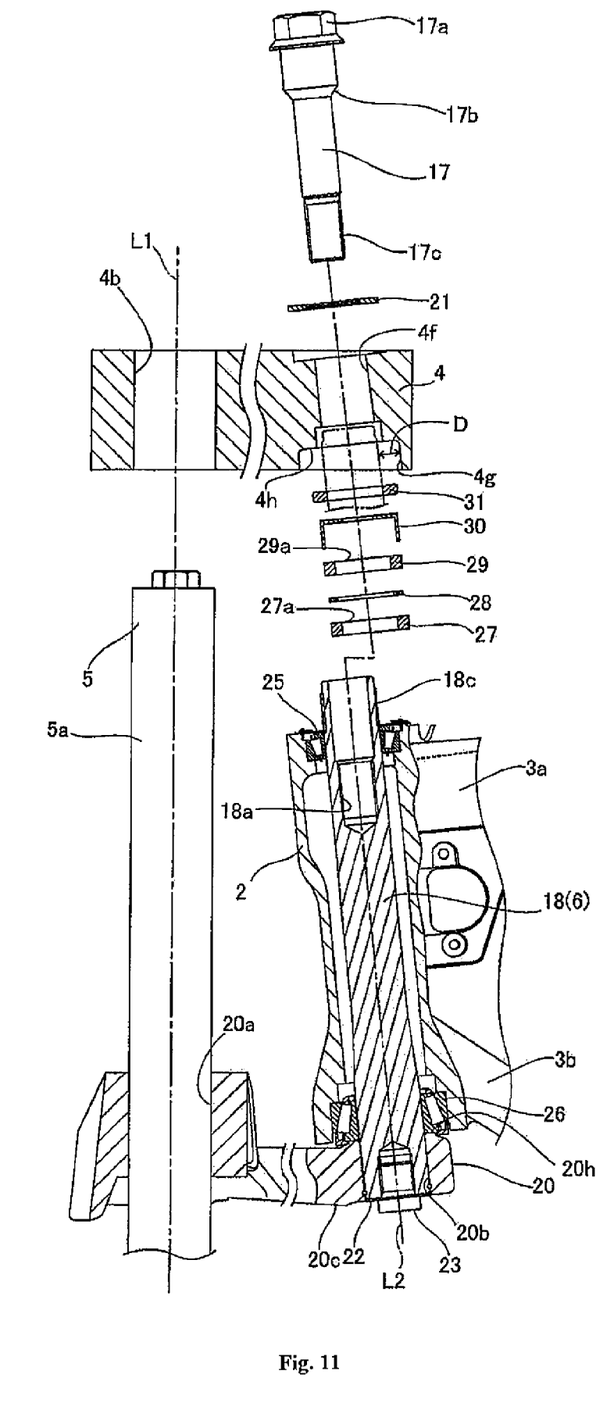
FIG. 11 illustrates an assembling sequence of the steering shaft and the upper bracket of the motorcycle of FIG. 1.

FIGS. 10 and 11 illustrate the steps of assembling front forks 5, steering shaft 6, and upper bracket 4.

Initially, as shown in FIG. 10, lower steering shaft 18 is attached to head pipe 2 fixed to main frame 3 in a state that front forks 5 and lower steering shaft 18 are fixed to under bracket 20. More specifically, lower steering shaft 18 is attached to head pipe 2 such that the outer peripheral surface of lower steering shaft 18 contacts the inner peripheral surfaces of taper-rolling bearing 25 and taper-rolling bearing 26, both of which are fitted to head pipe 2. Next, as shown in FIG. 11, nut 27 is screwed to screw section 18c of lower steering shaft 18 in order to fix lower steering shaft 18 attached to head pipe 2. Then, washer 28 is disposed on top surface 27a of nut 27, and nut 29 is screwed to screw section 18c of lower steering shaft 18 to contact the top surface of washer 28. Spacer 30 is disposed on top surface 29a of nut 29 and the side surfaces of nut 27, washer 28 and nut 29. Collar 31 is disposed on the top surface of spacer 30.

Next, upper bracket 4 is disposed from above head pipe 2. More specifically, upper bracket 4 is disposed such that front forks 5 are inserted into front fork inserting holes 4b of upper bracket 4. Upper bracket 4 is disposed such that top surface 4h of lower steering shaft accommodating hole 4g of upper bracket 4 comes into contact with the top surface of collar 31 when upper bracket 4 is tucked into front forks 5. Even when central axis L1 of front forks 5 and central axis L2 of lower steering shaft L2, which are nonparallel to each other, are fixed in advance, the predetermined clearance D is formed between the outer peripheral surface of lower steering shaft 18 and the inner peripheral surface of lower steering shaft accommodating hole 4g.

A washer 21 is placed on the top surface of upper steering shaft inserting hole 4f of upper bracket 4. Next, upper steering shaft 17 is inserted in upper steering shaft inserting hole 4f of upper bracket 4 such that the top surface of washer 21 abuts against the bottom surface of head section 17a of upper steering shaft 17. By rotating head section 17a with a designated tool, screw section 17c of upper steering shaft 17 is screwed and fixed to screw hole 18a of lower steering shaft 18. Accordingly, as shown in FIG. 5, front forks 5, steering shaft 6 and upper bracket 4 can be assembled in motorcycle 1.

In this embodiment, as described above, due to the configuration in which upper steering shaft 17 is fixed to lower steering shaft 18 while being inserted in upper bracket 4, even when central axis L1 of front forks 5 and central axis L2 of steering shaft 6 are not parallel to each other, it is possible to attach front forks 5 and steering shaft 6 to upper bracket 4 only by inserting upper steering shaft 17 in upper bracket 4 and by fixing upper steering shaft 17 to lower steering shaft 18 in a state that front forks 5 and lower steering shaft 18 are inserted in upper bracket 4. As a result, the assembly work of front forks 5, steering shaft 6 and upper bracket 4 is not complicated.

In this embodiment, as described above, defining the clearance D between the outer peripheral surface of the lower steering shaft and the inner peripheral surface of lower steering shaft accommodating hole 4g makes it possible to easily fit front forks 5 and lower steering shaft 18, which are not parallel to each other, into upper bracket 4, and then further to insert upper steering shaft 17 in upper bracket 4 to fix lower steering shaft 18. As a result, the assembly work of front forks 5, steering shaft 6 and upper bracket 4 is not complicated.

In this embodiment, as described above, front fork inserting hole 4b has an inner diameter equal to the outer diameter of inner tube 5a of front fork 5, and upper steering shaft inserting hole 4f has an inner diameter equal to the outer diameter of the portion of upper steering shaft 17 inserted in upper steering shaft inserting hole 4f. Therefore, the rattle of front forks 5 and upper steering shaft 17 can be eliminated with upper bracket 4 when upper bracket 4 is attached to front forks 5 and steering shaft 17.

In this embodiment, as described above, because taper-shaped section 17b narrowing toward lower steering shaft 18 side is formed on the portion of upper steering shaft 17 inserted in steering shaft inserting hole 4f of upper bracket 4, upper steering shaft 17 can easily be inserted in upper steering shaft inserting hole 4f. Also, the central axis of upper steering shaft 17 can easily be adjusted to that of upper steering shaft inserting hole 4f coaxially. As a result, the assembly work of steering shaft 6 and upper bracket 4 does not become complicated.

In this embodiment, as described above, lower steering shaft 18 has screw hole 18a to which screw section 17c of upper steering shaft 17 is screwed. Therefore, at the time of assembly, upper steering shaft 17 can be fixed to lower steering shaft 18 while being inserted in upper bracket 4 simply by inserting upper steering shaft 17 in upper steering shaft inserting hole 4f of upper bracket 4 and by screwing screw section 17c of upper steering shaft 17 to screw hole 18a of lower steering shaft 18. As a result, the assembly work of steering shaft 6 and upper bracket 4 does not become complicated.

In this embodiment, as described above, downward movement of steering shaft 6 and movement of front forks 5 in the vehicle width direction can be prevented by under bracket 20 disposed below head pipe 2 and supporting steering shaft 6 and front forks 5. Therefore, steering shaft 6 and front forks 5 are stably supported.

In this embodiment, as described above, lower steering shaft 18 is supported to be turnable by taper-rolling bearing 25 disposed at the top end of head pipe 2 and by taper-rolling bearing 26 disposed at the bottom end of head pipe 2 and supported upward by support section 20h of under bracket 20. Steering shaft 18 can thereby be turned smoothly, and lower steering shaft 18 is supported at two separate points at the top and bottom ends thereof. Consequently, lower steering shaft 18 is supported stably when it is turned.

In this embodiment, as described above, screw section 18c is formed on the outer peripheral surface of lower steering shaft 18, and nut 27 is screwed to screw section 18c of lower steering shaft 18 and fixing taper-rolling bearing 25. Therefore, nut 27 retains the position of taper-rolling bearing 25 with respect to lower steering shaft 18.

In this embodiment, as described above, because collar 31 is disposed between top surface 29a of nut 29 and top surface 4h of lower steering shaft accommodating hole 4g of upper bracket 4, the vertical position of upper bracket 4 can easily be adjusted.

In this embodiment, as described above, upper portions of front forks 5 are fixed to upper bracket 4 near both ends in the vehicle width direction by inserting front forks 5 in front fork inserting holes 4b of upper bracket 4. Therefore, motorcycle 1 is further stabilized as compared to a case where a single front fork 5 is provided. In addition, front forks 5 are fixed to both ends of upper bracket 4 relative to a rotational axis of upper bracket 4. Therefore, when upper bracket 4 turns, the pair of front forks 5 can turn further effectively.

The embodiment disclosed herein is given as a mere illustration in all respects, and not to impose any limitation. The scope of the present invention is defined by the claims rather than by the descriptions of the embodiment, and includes all modifications falling within the scope of the claims and equivalents thereof.

For example, while the present invention has been described as applied to a motorcycle, it is not limited to a motorcycle and may be applicable to other vehicles including a bracket for supporting a front fork, such as a bicycle, a tricycle and an all terrain vehicle (ATV).

Also, an example has been described in which the angle formed by the central axis of the front fork and the central axis of the steering shaft is approximately 6 degrees. However, the present invention is not so limited and the central axis of the front fork and that of the steering shaft may make an angle that is not approximately 6 degrees.

An example has been described in which a screw section is provided in the upper steering shaft while a screw hole is provided in the lower steering shaft. However, the present invention is not so limited, and the screw section may be provided in the lower steering shaft while the screw hole is provided in the upper steering shaft.

The invention claimed is:

1. A vehicle comprising:
a head pipe;
a shaft rotatably supported by the head pipe;
a front fork; and
a topside bracket arranged to support the shaft and the front fork; wherein
the shaft includes a topside shaft and a downside shaft;
the topside shaft is inserted in the topside bracket and then fixed to the downside shaft; and
the shaft and the front fork are arranged not to be parallel to each other so that a shared central axis of the topside shaft and the downside shaft intersects with a central axis of the front fork.

2. The vehicle according to claim 1, wherein the topside bracket includes:
a front fork inserting hole in which the front fork is inserted;
a topside shaft inserting hole in which the topside shaft is inserted; and
a downside shaft accommodating hole, which is in communication with the topside shaft inserting hole, and in which the downside shaft is accommodated; wherein
a predetermined clearance is provided between the downside shaft and the downside shaft accommodating hole.

3. The vehicle according to claim 2, wherein the front fork inserting hole has an inner diameter equal to an outer diameter of a portion of the front fork inserted in the front fork inserting hole, and the topside shaft inserting hole has an inner diameter equal to an outer diameter of a portion of the topside shaft inserted in the topside shaft inserting hole.

4. The vehicle according to claim 2, wherein a portion of the topside shaft inserted in the topside shaft inserting hole of the topside bracket includes a taper-shaped section narrowing toward the downside shaft.

5. The vehicle according to claim 1, wherein the topside shaft includes a first screw section arranged at a tip adjacent to the downside shaft, and a second screw section screwed to the first screw section is arranged at a tip of the downside shaft adjacent to the topside shaft.

6. The vehicle according to claim 1, further comprising a downside bracket disposed below the head pipe and supporting the shaft and the front fork.

7. The vehicle according to claim 6, wherein the downside shaft is rotatably supported by a first bearing member disposed at a top end of the head pipe and by a second bearing member disposed at a bottom end of the head pipe and supported in an upper side by a support section of the downside bracket.

8. The vehicle according to claim 7, wherein an outer peripheral surface of the downside shaft is provided with a screw section, and further includes a nut screwed to the screw section of the downside shaft and for fixing the first bearing member.

9. The vehicle according to claim 8, wherein the topside bracket includes:
a downside shaft accommodating hole to which the downside shaft is accommodated, and
a collar disposed between a top surface of the nut and a top surface of the downside shaft accommodating hole.

10. The vehicle according to claim 2, wherein the front forks are provided as a pair, and upper sections of the pair of the front forks are fixed by being inserted in front fork inserting holes of the topside bracket near both ends of the topside bracket in a vehicle width direction.

11. The vehicle according to claim 1, wherein the vehicle is a motorcycle.

* * * * *